United States Patent

Foster

(10) Patent No.: US 6,969,072 B2
(45) Date of Patent: Nov. 29, 2005

(54) CYLINDER HEAD GASKET WITH FOLD-OVER STOPPER

(75) Inventor: Jeffery A. Foster, Rolling Meadows, IL (US)

(73) Assignee: Dana Corporation, Toledo, OH (US)

( * ) Notice: Subject to any disclaimer, the term of this patent is extended or adjusted under 35 U.S.C. 154(b) by 94 days.

(21) Appl. No.: 10/425,139

(22) Filed: Apr. 28, 2003

(65) Prior Publication Data

US 2004/0212155 A1 Oct. 28, 2004

(51) Int. Cl.[7] .................................................. F02F 11/00
(52) U.S. Cl. ...................................... 277/593; 277/595
(58) Field of Search ................................ 277/593–596

(56) References Cited

U.S. PATENT DOCUMENTS

| | | | |
|---|---|---|---|
| 4,836,562 A | 6/1989 | Yoshino | |
| 4,976,445 A | 12/1990 | Udagawa | |
| 4,995,624 A | 2/1991 | Udagawa et al. | |
| 5,209,504 A | 5/1993 | Udagawa et al. | |
| 5,213,345 A | 5/1993 | Udagawa | |
| 5,240,261 A | 8/1993 | Udagawa et al. | |
| 5,294,135 A | 3/1994 | Kubouchi et al. | |
| 5,310,196 A | 5/1994 | Kawaguchi et al. | |
| 5,348,315 A | 9/1994 | Kawaguchi et al. | |
| 5,451,063 A | 9/1995 | Udagawa et al. | |
| 5,727,795 A | 3/1998 | Plunkett | |
| 5,988,650 A | * 11/1999 | Plunkett | 277/593 |
| 6,135,459 A | * 10/2000 | Hiramatsu et al. | 277/593 |
| 6,186,513 B1 | * 2/2001 | Udagawa | 277/593 |
| 6,257,591 B1 | * 7/2001 | Abe et al. | 277/591 |
| 6,315,303 B1 | * 11/2001 | Erb et al. | 277/593 |
| 2003/0062691 A1 | * 4/2003 | Diez et al. | 277/590 |
| 2003/0168818 A1 | * 9/2003 | Pepin | 277/593 |

FOREIGN PATENT DOCUMENTS

| | | | | |
|---|---|---|---|---|
| EP | 0940608 A1 | * 8/1999 | | F16J/15/08 |
| EP | 1111277 A2 | * 6/2004 | | F16J/15/08 |

* cited by examiner

*Primary Examiner*—Alison Pickard
*Assistant Examiner*—Vishal Patel
(74) *Attorney, Agent, or Firm*—Rader, Fishman & Grauer PLLC

(57) ABSTRACT

A multi-layered cylinder head gasket for positioning between a cylinder head and a cylinder block of an engine includes upper and lower compression layers and a stopper layer. The compression layers and stopper layer all include apertures that mate together to define a peripheral edge. The stopper layer further includes a folded portion and a main body portion. The folded portion has a plurality of waves that contact the main body portion of the stopper layer to form a stopper when folded over. The stopper is positioned at the peripheral edge of the mated aperture. The waves deform under high compression loads generated by the joining of the cylinder head and the cylinder block. The deformation balances the stresses generated by the compression loads around the mated aperture.

15 Claims, 2 Drawing Sheets

US 6,969,072 B2

CYLINDER HEAD GASKET WITH FOLD-OVER STOPPER

TECHNICAL FIELD

The present invention relates to a multi-layered cylinder head gasket and more particularly to a gasket having a stopper layer with a folded portion that includes a plurality of waves that forms a stopper when folded over onto a main body portion of the stopper layer.

BACKGROUND OF THE INVENTION

In the field of cylinder head gaskets, the gaskets are generally formed of a plurality of sheet metal plates. A typical problem associated with these multi-layered steel gaskets is that, when assembled, a cylinder head and cylinder block tend to warp under the forces of the bolts joining the head and block together. Accordingly, the gap between the cylinder head and the cylinder block is greater surrounding combustion chamber holes than in the areas surrounding the bolts. To combat this problem, gaskets often contain sealing beads and stoppers in the edges of the sheet metal plates of the gasket around the combustion chamber holes.

Specifically, the stoppers are used to fill the gap generated around the combustion chamber holes. There are various techniques for generating a stopper. One such technique includes a plate of the gasket having a folded portion that is folded over to form a rigid stopper. The rigid stopper helps to fill the gap about the combustion chamber holes, but is often not strong enough to eliminate brinneling and layer cracking under high compression loads. There remains a need for a cylinder head gasket that incorporates a stopper about combustion chamber holes that generates a seal strong enough to withstand high compression loads such as those generated by a diesel engine.

SUMMARY OF THE INVENTION

The present invention is directed to a gasket that withstands high compression loads of diesel engines with the use of a stopper layer having a folded portion with a plurality of waves that forms a stopper when folded over onto a main body portion of the stopper layer.

Specifically, the invention is directed to a gasket comprising upper and lower compression layers, each including an aperture, and a stopper layer. The stopper layer is positioned between the compression layers, which also includes an aperture. The apertures of the stopper layer and compression layers are mated together and define a peripheral edge.

The stopper layer further includes a main body portion and a folded portion. The folded portion has a plurality of waves formed thereon. The folded portion is folded on itself with the waves contact of a top surface of a portion of the folded portion to form a stopper when the folded portion is folded over on to itself.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
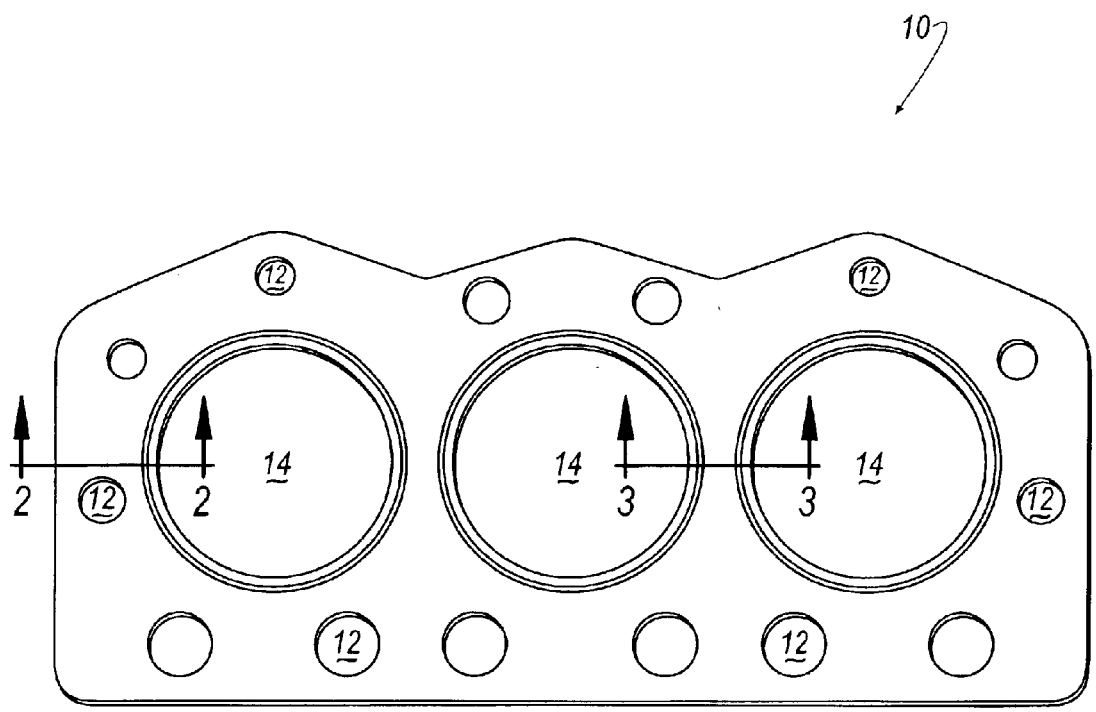
FIG. 1 is a top view of a cylinder head gasket of the present invention.

As seen in FIG. 1, a gasket of the present invention is generally referred to at 10. The gasket 10 includes a plurality of apertures such as bolt holes 12 and combustion openings 14 that mate with corresponding apertures of a cylinder head (not shown) and cylinder block (not shown). When fully assembled, the gasket 10 is positioned between the cylinder head and cylinder block to fill gaps and seal around various holes 12 and openings 14. The seal generated by gasket 10 serves to prevent leaks and contamination.

Gaps between the cylinder head and cylinder block are created when a fastener (not shown) is tightened to mate the cylinder head and cylinder block. These gaps result in unequal sealing stresses around the bolt holes 12 and the combustion openings 14. Furthermore, the gasket 10 is subject to high compression loads such as those generated in a diesel engine. The high compression loads generate higher stresses that may result in failure of the gasket 10, such as cracking. The present invention will herein be described with attention to the sealing stresses generated about the combustion openings 14. However, gasket 10 of the present invention may incorporate the described features about any aperture. Furthermore, various embodiments of the multi-layered gasket 10 are shown throughout FIGS. 2A–3 and similar reference numerals are used throughout FIGS. 1 and 2A–3.

In accordance with the present invention, the gasket 10 is a multi-layered gasket 10 having an upper compression layer 16 and a lower compression layer 18. Positioned between the upper and lower compression layers 16, 18 is a stopper layer 20. The compression layers 16, 18 and stopper layer 20 are joined together by techniques commonly used by one skilled in the art, such as adhesives or welding. However, any technique for joining the layers 16, 18, 20 is contemplated by this invention. Each of the compression layers 16, 18 and the stopper layer 20 include an aperture, such as combustion opening 14. When the layers 16, 18, 20 are joined together the apertures or combustion openings 14 are mated and define a peripheral edge generally shown at 22.

Figure 2A:
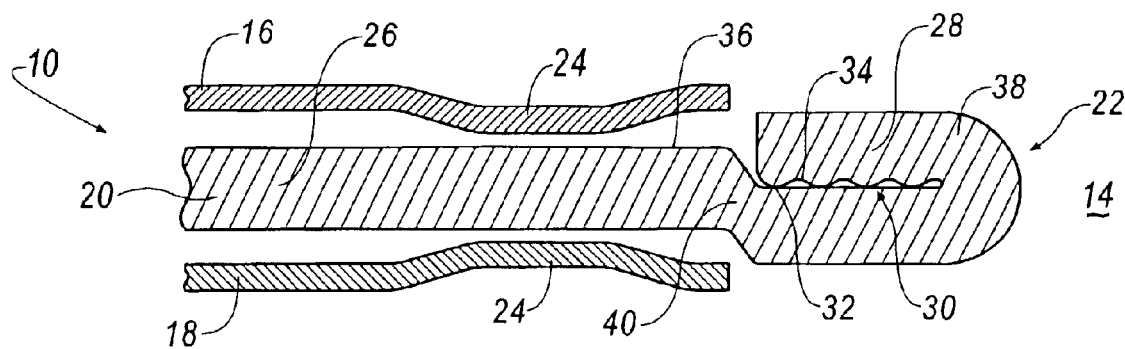
FIG. 2A is a cross-sectional view of a first embodiment of the present invention taken along the lines 2—2 of FIG. 1.
Figure 2B:
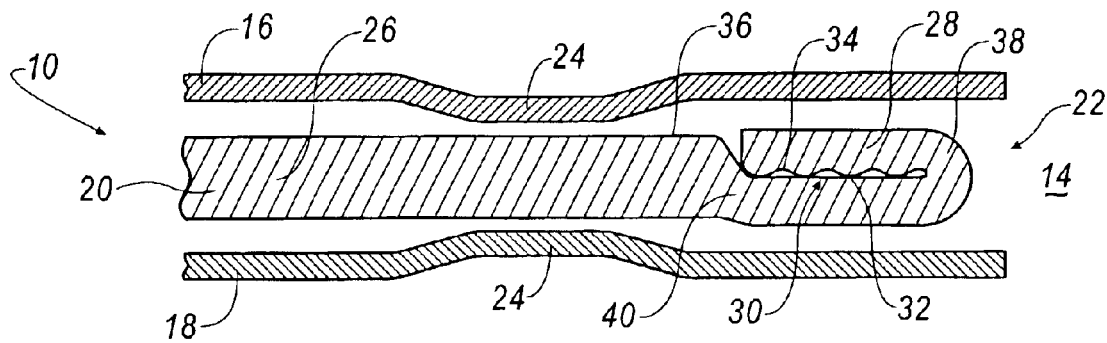
FIG. 2B is a cross-sectional view of a second embodiment of the present invention taken along the lines 2—2 of FIG. 1.
Figure 2C:
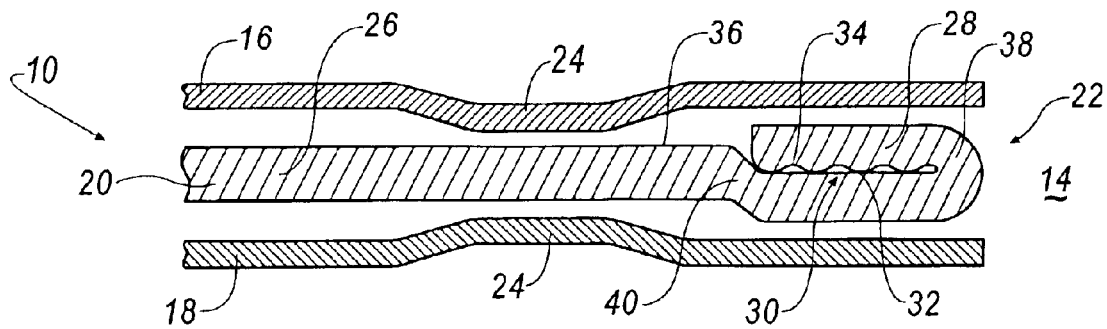
FIG. 2C is a cross-sectional view of a third embodiment of the present invention taken along the lines 2—2 of FIG. 1.
Figure 3:
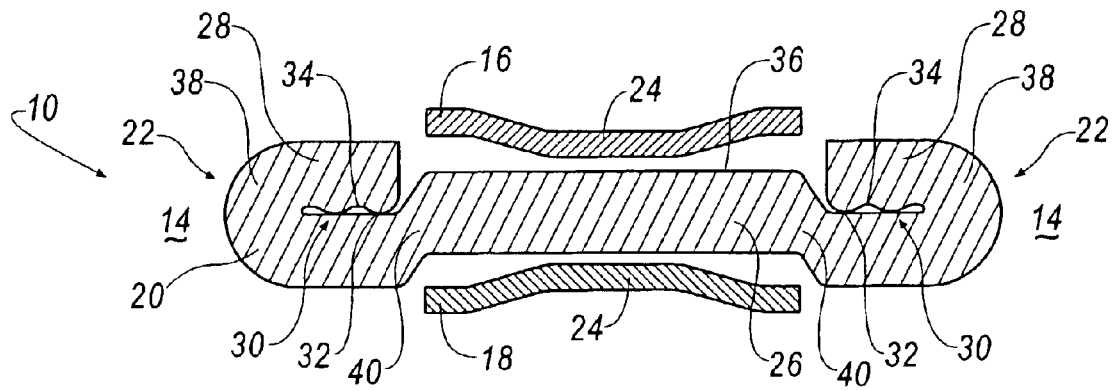
FIG. 3 is a cross-sectional view of a fourth embodiment of the present invention taken along the lines 3—3 of FIG. 1.

Referring specifically to the compression layers 16, 18 shown in FIGS. 2A–3, the upper compression layer 16 and lower compression layer 18 each include a sealing bead 24. The sealing beads 24 are generally a projection in the relatively planar surface of the layers 16, 18. The beads 24 may extend linearly outward from the relatively planar surface of the layers 16, 18 in either direction. As shown in FIGS. 2A–3, the sealing beads 24 extend inward toward the stopper layer 20. However, this is in no way limiting the projection of the sealing beads 24 to a particular direction. The particular direction is determined from the sealing expectations of the gasket 10 for a particular engine configuration.

Referring specifically to the stopper layer 20 shown throughout FIGS. 2A–3, the stopper layer 20 includes a main body portion 26 and a folded portion 28. The main body portion 26 comprises a majority of the stopper layer 20, while the folded portion 28 is generally smaller and positioned adjacent the peripheral edge 22 of the combustion opening 14. The main body portion 26 is mated with the upper and lower compression layers 16, 18, including the sealing beads 24. The stopper layer 20 is generally of uniform thickness; however, the stopper layer 20 may vary in thickness to accommodate sealing expectations for particular engine configurations. As an example, in FIG. 2B the thickness of the stopper layer 20 is reduced at the folded portion.

The folded portion 28 of the stopper layer 20 includes a plurality of waves generally shown at 30. Each wave 30 includes a peak 32 and a valley 34. The waves 30 are typically formed on an upper surface 36 of the stopper layer 20 by a coining technique generally known in the art. The quantity of waves 30 may vary as may the depths of each valley 34 and the height of each peak 32. Again, the quantity, depths and heights of the waves 30 and the peaks 32 and valleys 34 are dependent upon scaling expectations for particular engine configurations. Reducing the quantity of waves will have an overall softening effect on the resultant seal of gasket 10.

After the waves 30 are coined into the upper surface 36 of the stopper layer 20, the folded portion 28 is folded over on itself to create a stopper 38. The peaks 32 of the waves 30 contact the upper surface 36 of the stopper layer 20 in the main body portion 26. When subjected to a high compression load, the waves 30 deform and the peaks 32 penetrate the upper surface 36 of the main body portion 26 of the stopper layer 20. The deformation of the waves 30 will help to balance the stresses generated around the combustion opening 14 and create a more effective seal.

Furthermore, as shown in FIGS. 2A–3, the stopper layer 20 may also include a deviation 40 from its relatively planar arrangement. The deviation 40 is positioned adjacent the folded portion 28. The inclusion of a deviation 40 depends upon particular engine configurations and sealing requirements about combustion opening 14. The deviation 40 is only an adjustment to the relatively planar surface of the stopper layer 20. The stopper layer retains its generally uniform thickness even at the portion of the stopper layer 20 including the deviation 40. Alternatively, as shown in FIG. 2B, when the stopper layer 20 is reduced in thickness, the stopper layer 20 may still include a deviation 40 from its generally flat arrangement that is adjacent the folded portion 28. The purpose of the deviation 40 is to generate a resultant stopper 38 of a specific thickness or height to accommodate particular engine configurations and scaling requirements.

Finally, FIGS. 2A–3 show various alternative embodiments of the arrangement of the compression layer 16, 18 and the stopper layer 20. Specifically, in FIGS. 2B and 2C, the resultant stopper 38 may be mated with the upper and lower compression layers 16, 18. Alternatively, the gaskets 10 shown in FIGS. 2A and 3 illustrate the resultant stoppers 38 not mated with the upper and lower compression layers 16, 18. Again, the positioning of the resultant stopper 38 between the compression layers 16, 18 is dependant upon particular engine configurations and sealing requirements. Furthermore, as shown in FIG. 3, the gasket 10 may also include a plurality of folded portions 28 and resultant stoppers 38. As shown, the plurality of stoppers 38 are positioned at opposite ends of the main body portion 26 and at peripheral edges 22 of adjacent combustion openings 14.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. A gasket comprising:

an upper compression layer and a lower compression layer each including an aperture;

a stopper layer, positioned between said upper compression layer and said lower compression layer, wherein said stopper layer includes an aperture and said aperture of said stopper layer mates with said apertures of said upper and lower compression layers to form a mated aperture defining a peripheral edge; and said stopper layer further including a substantially planar main body portion and a folded portion, having a planar surface and a surface opposite the planar surface that includes a plurality of waves and said waves contact said substantially planar main body portion to form a stopper when said folded portion is folded over onto itself.

2. A gasket, as in claim 1, wherein said stopper is positioned at said peripheral edge.

3. A gasket, as in claim 1, wherein said upper compression layer includes a sealing bead.

4. A gasket, as in claim 1, wherein said lower compression layer includes a sealing bead.

5. A gasket, as in claim 1, wherein said stopper layer has a reduced thickness at said folded portion.

6. A gasket as in claim 1, wherein said stopper layer further includes a deviation at said folded portion.

7. A gasket, as in claim 1, wherein said plurality of waves include a plurality of peaks and valleys.

8. A gasket, as in claim 7, wherein said stopper layer includes an upper surface and said plurality of peaks of said plurality of waves contact said upper surface when said folded portion is folded over.

9. A gasket, as in claim 7, wherein said plurality of waves includes said plurality of valleys with varied depths.

10. A gasket, as in claim 7, wherein said plurality of waves includes a plurality of peaks with raised heights.

11. A gasket, as in claim 1, wherein said plurality of waves penetrate a portion of said folded portion when the gasket is compressed.

12. A gasket, as in claim 1, wherein said stopper formed by said folded portion is positioned between said upper compression layer and said lower compression layer.

13. A gasket comprising:

an upper compression layer and a lower compression layer each including an aperture;

a stopper layer, positioned between said upper compression layer and said lower compression layer, wherein said stopper layer includes an aperture and said aperture of said stopper layer mates with said apertures of said upper and lower compression layers to form a mated aperture defining a peripheral edge; and said stopper layer further including a substantially planar main body portion and a folded portion, wherein said folded portion includes a plurality of waves having a plurality of valleys with varied depths and said waves contact said substantially planar main body portion to form a stopper when said folded portion is folded over onto itself.

14. A gasket, as in claim 1, wherein said stopper layer has a generally uniform thickness.

15. A gasket, as in claim 1, wherein said stopper layer includes a plurality of folded portions with a plurality of waves to form a plurality of stoppers when said plurality of folded portions are folded over.

* * * * *